US012060003B2

(12) United States Patent
Whitehouse et al.

(10) Patent No.: US 12,060,003 B2
(45) Date of Patent: Aug. 13, 2024

(54) CONTROL SYSTEM AND METHOD FOR A VEHICLE

(71) Applicant: JAGUAR LAND ROVER LIMITED, Warwickshire (GB)

(72) Inventors: Stuart Whitehouse, Coventry (GB); Ilias Aitidis, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/773,143

(22) PCT Filed: Oct. 30, 2020

(86) PCT No.: PCT/EP2020/080547
§ 371 (c)(1),
(2) Date: Apr. 29, 2022

(87) PCT Pub. No.: WO2021/084088
PCT Pub. Date: May 6, 2021

(65) Prior Publication Data
US 2023/0249617 A1 Aug. 10, 2023

(30) Foreign Application Priority Data
Oct. 31, 2019 (GB) ..................... 1915810

(51) Int. Cl.
*G08G 1/16* (2006.01)
*B60Q 9/00* (2006.01)

(52) U.S. Cl.
CPC .............. *B60Q 9/008* (2013.01); *G08G 1/16* (2013.01); *G08G 1/167* (2013.01); *G08G 1/168* (2013.01)

(58) Field of Classification Search
CPC .......... G08G 1/16; G08G 1/165; G08G 1/166; G08G 1/167; B60W 50/00; B60W 50/14;
(Continued)

(56) References Cited

U.S. PATENT DOCUMENTS

2008/0036581 A1* 2/2008 Bunims ................... B60R 22/48
280/801.1
2010/0246327 A1 9/2010 Yoshida
(Continued)

FOREIGN PATENT DOCUMENTS

EP 1674826 A1 6/2006
GB 2540424 A 1/2017
(Continued)

OTHER PUBLICATIONS

NPL Search (Oct. 27, 2023).*
(Continued)

*Primary Examiner* — Van T Trieu
(74) *Attorney, Agent, or Firm* — Carlson, Gaskey & Olds, P.C.

(57) ABSTRACT

Aspects of the present invention relate to a control system (1) for controlling generation of a proximity alert for a vehicle (2). The control system comprises one or more controllers (80). The control system (1) is configured to determine an operating state of the vehicle (2) within a spatial environment in dependence on vehicle data from one or more vehicle systems (10, 30, 40, 50, 60). The operating state indicates whether the vehicle (2) is currently in an on-road state or an off-road state. The control system (1) controls generation of the proximity alert in dependence on the determined operating state. Aspects of the present invention also relate to a vehicle (2) comprising a control system (1); a method of controlling generation of a proximity alert; computer software and a non-transitory, computer-readable storage medium.

13 Claims, 4 Drawing Sheets

(58) Field of Classification Search
CPC ...... B60W 50/16; B60W 40/00; B60W 30/00; B60W 30/08; B60W 40/08; B60Q 1/50; B60Q 9/00; B60Q 9/008; G01S 15/00; G01S 15/04; G01S 15/931; G06V 20/58
See application file for complete search history.

(56) References Cited

U.S. PATENT DOCUMENTS

| | | | | |
|---|---|---|---|---|
| 2015/0201120 | A1* | 7/2015 | Irie | G08G 1/166 |
| | | | | 348/148 |
| 2018/0244292 | A1* | 8/2018 | Bailey | B61L 23/20 |
| 2018/0364739 | A1* | 12/2018 | Foster | G05D 1/0219 |
| 2019/0077406 | A1* | 3/2019 | Dudar | B60W 40/06 |
| 2019/0184985 | A1 | 6/2019 | Tokish et al. | |

FOREIGN PATENT DOCUMENTS

| | | | |
|---|---|---|---|
| JP | 2012192862 A | 10/2012 | |
| JP | 2017024472 A | 2/2017 | |

OTHER PUBLICATIONS

Combined Search and Examination Report under Sections 17 and 18(3) for Application No. GB1915810.4 dated Apr. 15, 2020.
International Search Report and Written Opinion of the International Searching Authority for International application No. PCT/EP2020/080547 dated Jan. 11, 2021.
Examination Report under Section 18(3) for Application No. GB1915810.4 dated Feb. 17, 2022.

\* cited by examiner

CONTROL SYSTEM AND METHOD FOR A VEHICLE

TECHNICAL FIELD

The present disclosure relates to a control system and method for a vehicle. Aspects of the invention relate to a control system, a vehicle, a method, computer software and non-transitory, computer-readable storage medium.

BACKGROUND

It is known to provide a vehicle with a parking aid system for generating an alert (referred to herein as a proximity alert) when an object (or objects) are detected in proximity of the vehicle.

The proximity alert may comprise an audio component, such as a continuous or interrupted tone; and/or a visible component, such as a warning graphic or alert. The alert is intended to notify the driver of the presence of an obstacle or the like and to enable them to take appropriate action to avoid the obstacle. This is advantageous when the driver is seeking to park the vehicle. However, when the vehicle is in an off-road scenario, the ground has many undulations and objects such as rocks, tree stumps and potholes. Driving across this terrain may result in the generation of false positives that cause the parking aid system to generate a proximity alert. The number and frequency with which the proximity alerts are generated may prove frustrating for the driver while driving off-road. It is known to enable the driver to mute the parking aid system, but this typically unmutes if the driver shifts to a Reverse gear.

It is an aim of the present invention to address one or more of the disadvantages associated with the prior art.

SUMMARY OF THE INVENTION

Aspects and embodiments of the invention provide a control system, a vehicle, a method, computer software and non-transitory, computer-readable storage medium as claimed in the appended claims According to an aspect of the present invention there is provided a control system for controlling generation of a proximity alert for a vehicle, the control system configured to determine an operating state of the vehicle within a spatial environment in dependence on vehicle data from one or more vehicle systems, the operating state indicating whether the vehicle is currently in an on-road state or an off-road state. The control system may be configured to control generation of the proximity alert in dependence on the determined operating state. The control system may selectively inhibit and permit (i.e. enable or allow) generation of the proximity alert. As described herein, the generation of the proximity alert may be permitted if the operating state indicates that the vehicle is operating in an on-road state; and may be inhibited if the operating state indicates that the vehicle is operating in an off-road state. At least in certain embodiments, control of the generation of the proximity alert may be implemented automatically in dependence on changes in the operating state of the vehicle.

The proximity alert may be generated in dependence on a proximity signal received from one or more proximity sensors. The or each proximity sensor may, for example, comprise an ultrasonic sensor. Alternatively, or in addition, the or each proximity sensor may comprise a imaging device, such as a camera or the like.

The one or more controllers may collectively comprise: at least one electronic processor having an electrical input for receiving the vehicle data from the one or more vehicle systems; and at least one memory device electrically coupled to the at least one electronic processor and having instructions stored therein. The at least one electronic processor may be configured to access the at least one memory device and execute the instructions thereon so as to determine the operating state of the vehicle.

The proximity alert may comprise or consist of an audio component.

Alternatively, or in addition, the proximity alert may comprise a visible component, for example displayed on a screen. The control system may be configured to control generation of the proximity alert by changing a visible characteristic of the visible component when the determined operating state indicates that the vehicle is currently in an off-road state. The visible characteristic may comprise one or more of the following: composition, colour, brightness, form and size. Alternatively, or in addition, a different visible component may be output. A first visible component may be output when the determined operating state indicates that the vehicle is currently in an on-road state. A second visible component may be output when the determined operating state indicates that the vehicle is currently in an off-road state. The first and second visible components may be different from each other.

Alternatively, or in addition, the proximity alert may comprise a haptic component.

The proximity alert may be generated by a parking aid system. The parking aid system may utilise one or more sensors to detect the presence of one or more objects proximal to the vehicle. The control system described herein could be incorporated into the parking aid system. Alternatively, the control system may be separate from the parking aid system. The control system may be configured to control operation of the parking aid system. The control system may control generation of the proximity alert by selectively activating and deactivating the parking aid system. The control system may be configured to deactivate the parking aid system when the determined operating state indicates that the vehicle is currently in an off-road state. The control system may be configured to activate the parking aid system when the determined operating state indicates that the vehicle is currently in an on-road state. Alternatively, the control system may be configured to control the parking aid system to control generation of the proximity alert. The control system may control the parking aid system to inhibit generation of the proximity alert when the determined operating state indicates that the vehicle is currently in an off-road state. The control system may control the parking aid system to change a distance (range) to an object which triggers generation of the proximity alert.

The control system may be configured to control generation of the proximity alert by inhibiting generation of the proximity alert when the determined operating state indicates that the vehicle is currently in an off-road state. As described herein, the proximity alert may comprise an audio component and a visible component. The control system may inhibit generation of the audio component and enable generation of the visible component when the determined operating state indicates that the vehicle is currently in an off-road state.

The control system may be configured to control generation of the proximity alert by changing a characteristic of the proximity alert when the determined operating state indicates that the vehicle is currently in an off-road state. The characteristic of the proximity alert may be an audio characteristic, the audio characteristic may comprise one or more of the following: volume, pitch and an audio pattern/profile. Alternatively, or in addition, a different audio component may be output. A first audio component may be output when the determined operating state indicates that the vehicle is currently in an on-road state. A second audio component may be output when the determined operating state indicates that the vehicle is currently in an off-road state. The first and second audio components may be different from each other.

The control system may be configured to control generation of the proximity alert by enabling generation of the proximity alert when the determined operating state indicates that the vehicle is in an on-road state.

The control system may be configured to control generation of the proximity alert by modifying a first distance for activating the proximity alert. The first distance may, for example, comprise a first distance threshold.

The control system may be configured to apply the first distance when the determined operating state indicates that the vehicle is currently in an on-road state. The control system may be configured to apply a second distance when the determined operating state indicates that the vehicle is currently in an off-road state. The first and second distances may be different from each other. The second distance may be less than the first distance. By applying the second distance (which is less than the first distance), the generation of the proximity alert is restricted to those instances where there is a greater risk of a collision with the object(s).

The control system may be configured to apply a first control strategy when the operating state indicates that the vehicle is in an on-road state. The control system may be configured to apply a second control strategy when the operating state indicates that the vehicle is in an off-road state. The first and second control strategies may be different from each other. The first control strategy may define a first proximity alert; and the second control strategy may define a second proximity alert. The first and second proximity alerts may be different from each other.

The vehicle system may comprise one or more of the following:
 an operating mode control unit for controlling an operating mode of the vehicle;
 a transmission control unit for controlling operation of a controller;
 an engine control unit for controlling operation of an internal combustion engine;
 a motor control unit for controlling operation of an electric traction motor; and
 a suspension control unit for controlling operation of one or more suspension assemblies.

The vehicle data may comprise one or more of the following:
 an operating mode signal indicating a current operating mode of the vehicle;
 a transmission mode signal indicating a current drive ratio; and
 an engine status signal comprising data indicating the current operating conditions of the internal combustion engine;
 a motor status signal comprising data indicating the current operating conditions of the electric traction motor; and
 a suspension status signal indicating a current suspension configuration of the vehicle.

The control system may determine that the vehicle is currently in an on-road state when the operating mode signal indicates a first operating mode; and may determine that the vehicle is currently in an off-road state when the operating mode signal indicates a second operating mode. The control system may determine that the vehicle is currently in an on-road state when the transmission mode signal indicates a first one of a plurality of drive ratios; and may determine that the vehicle is currently in an off-road state when the transmission mode signal indicates a second one of the plurality of drive ratios. The control system may determine that the vehicle is currently in an on-road state when the suspension status signal indicates a first suspension configuration; and may determine that the vehicle is currently in an off-road state when the suspension status signal indicates a second suspension configuration.

The vehicle data may comprise geospatial data indicating a current geospatial location of the vehicle. The geospatial data may be used to determine the geospatial location of the vehicle with reference to map data. The map data may define the location of a road network, for example defining a network of roads having a durable surface (optionally also comprising roads having a metaled surface); and/or a network of tracks or roads having an un-metaled surface. The control system may determine if the current location of the vehicle in the spatial environment is coincident with one of the roads or tracks defined in the map data. If the current location is on a road or track, the control system may determine that the vehicle is in an on-road state. If the current location is not on a road or track, for example on an un-metaled surface, the control system may determine that the vehicle is in an off-road state.

The vehicle data may comprise sensor data captured by a sensor disposed on the vehicle. The control system may be configured to process the sensor data to analyse the spatial environment. The control system may, for example, determine whether the spatial environment is indicative of an on-road state or an off-road state. The one or more sensor may comprise an optical sensor, such as a video camera. The sensor data may comprise image data. The control system may perform image processing to analyse the image data.

According to a further aspect of the present invention there is provided a vehicle comprising the control system as described herein.

According to a still further aspect of the present invention there is provided a method of controlling generation of a proximity alert in a vehicle, the method comprising:
 determining an operating state of the vehicle within a spatial environment, the operating state indicating whether the vehicle is currently in an on-road state or an off-road state. The method may comprise controlling generation of the proximity alert in dependence on the determined operating state.

The proximity alert may comprise or consist of an audio component and, optionally, a visible component.

Controlling generation of the proximity alert may comprise inhibiting generation of the proximity alert when the determined operating state indicates that the vehicle is in an off-road state.

Controlling generation of the proximity alert may comprise changing a characteristic of the proximity alert when the determined operating state indicates that the vehicle is in an off-road state.

Controlling generation of the proximity alert may comprise enabling generation of the proximity alert when the determined operating state indicates that the vehicle is in an on-road state.

Controlling generation of the proximity alert may comprise modifying a first distance for activating the proximity alert. The first distance may be applied when the determined operating state indicates that the vehicle is currently in an on-road state. A second distance may be applied when the determined operating state indicates that the vehicle is currently in an off-road state. The first and second distances may be different from each other. In certain scenarios, the second distance may be greater than the first distance.

The operating state of the vehicle within the spatial environment may be determined in dependence on one or more of the following:
 a current operating mode of the vehicle;
 a current drive ratio of a transmission in the vehicle;
 a current suspension configuration of one or more suspension assemblies in the vehicle; and
 a current geospatial location of the vehicle.

According to a further aspect of the present invention there is provided computer software that, when executed, is arranged to perform a method as described herein.

According to a further aspect of the present invention there is provided a non-transitory, computer-readable storage medium storing instructions thereon that, when executed by one or more electronic processors, causes the one or more electronic processors to carry out the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
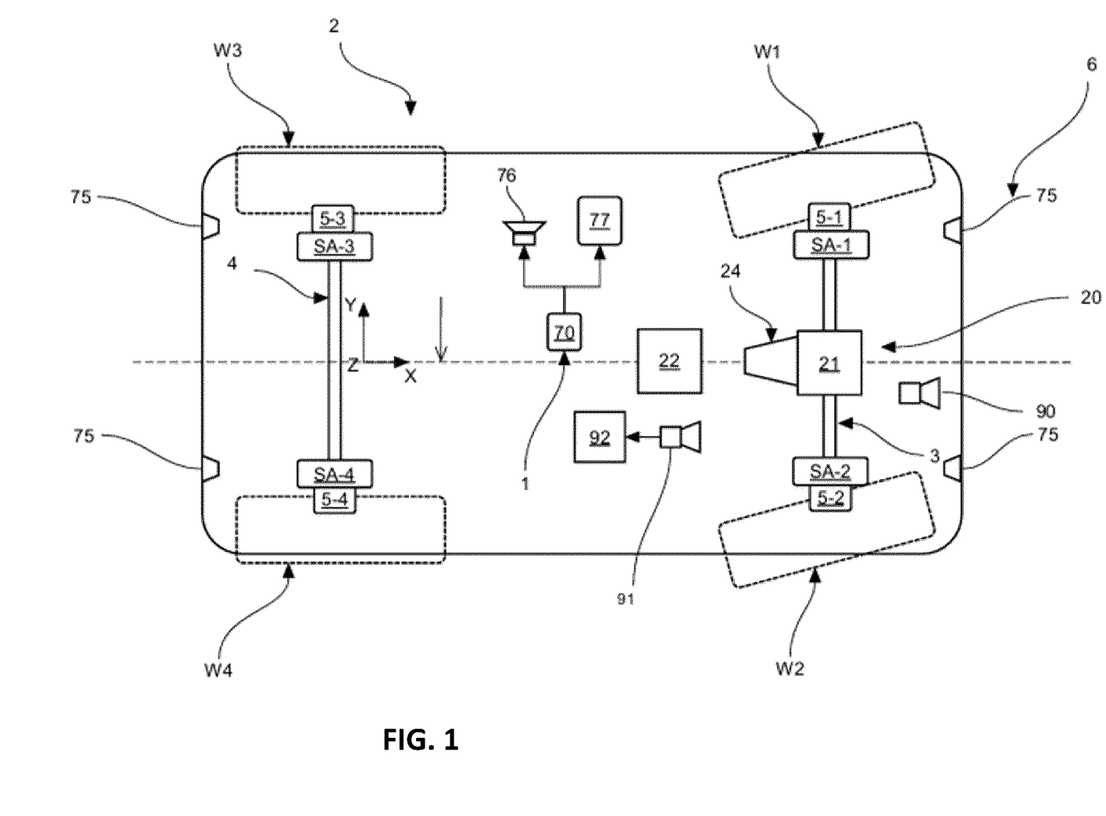
FIG. 1 shows a schematic representation of a vehicle incorporating a control system in accordance with an embodiment of the present invention.

A control system 1 in accordance with an embodiment of the present invention will now be described with reference to the accompanying figures. As shown in FIG. 1, the control system 1 is installed in a vehicle 2. The control system 1 is configured to determine an operating state of the vehicle 2 within a spatial environment. As described herein, the determined operating state indicates whether the vehicle 2 is in an on-road state or an off-road state.

As illustrated in FIG. 1, the vehicle 2 in the present embodiment is an automobile. More particularly, but not exclusively, the vehicle 2 is an automobile capable of operating off-road, for example traversing rough terrain which may be unsurfaced or unmetaled. The automobile may, for example, be a utility vehicle or a sports utility vehicle. Other types of host vehicle are also useful. The vehicle 2 is described herein with reference to a reference frame comprising a longitudinal axis X, a transverse axis Y and a vertical axis Z. A rotation about the longitudinal axis X is referred to herein as a rolling motion; a rotation about the transverse axis Y is referred to herein as a pitching motion; and a rotation about the vertical axis Z is referred to herein as a yawing motion. The vehicle 2 has a longitudinal centreline CL extending along the longitudinal axis X.

Figure 2:
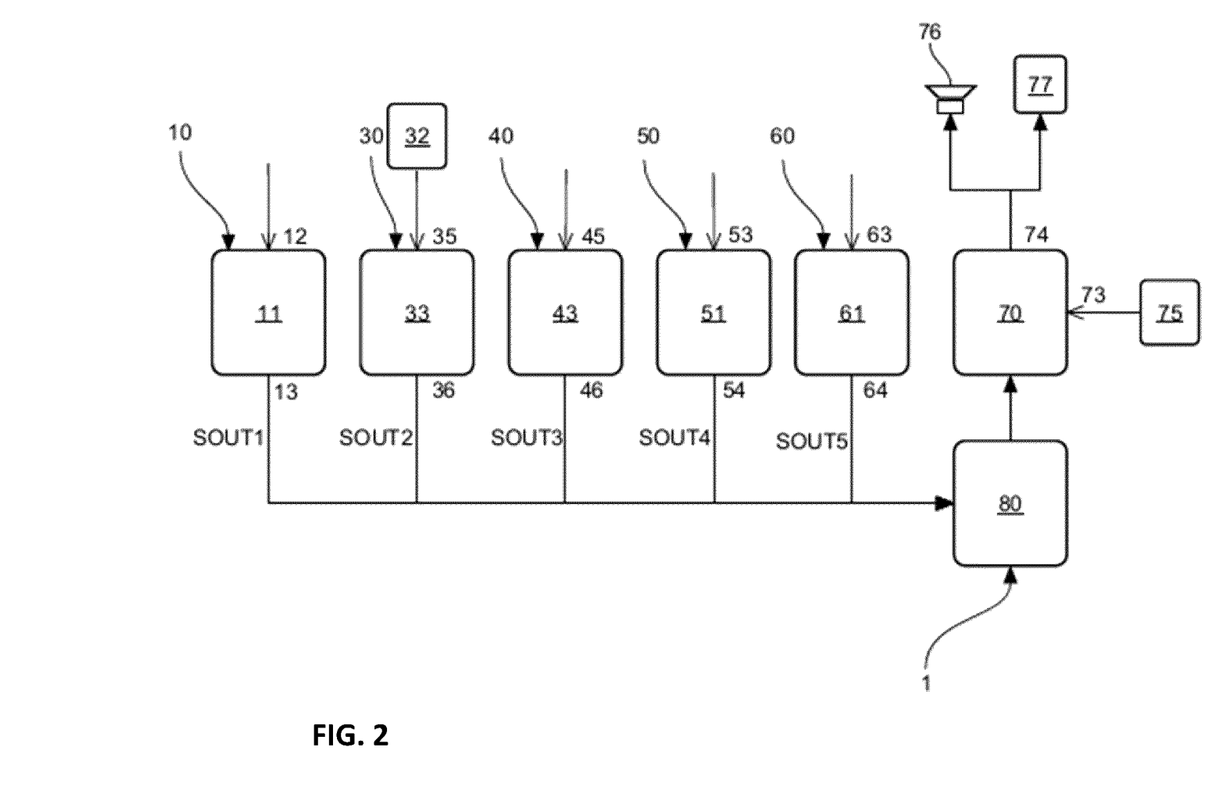
FIG. 2 shows a schematic representation of the control system shown in FIG. 1 and the vehicle systems.

With reference to FIGS. 1 and 2, the vehicle 2 comprises four (4) wheels W1-4. The wheels W1-4 are provided on front and rear axles 3, 4. As illustrated in FIG. 1, the first and second wheels W1, W2 provided on the front axle 3 are steerable to control a direction of travel of the vehicle 2. A wheel speed sensor 5-$n$ is associated with each wheel W1-4. The wheel speed sensor 5-$n$ output respective wheel speed signals which are used to determine a vehicle reference speed VREF. Other techniques may be used to determine the vehicle reference speed VREF. The vehicle reference speed VREF is published for use by vehicle systems. The vehicle 2 comprises a parking aid system 6 for generating a proximity alert to notify an occupant of the vehicle, such as the driver, that an object (or objects) are proximal to the vehicle 2. The proximity alert is intended to facilitate controlling the vehicle 2 to avoid contacting the object(s).

The wheels W1-4 are each supported by a suspension assembly SA1-4 which is configured to accommodate vertical movement. The suspension assemblies SA1-4 enable independent vertical movement of the wheels W1-4. The suspension assemblies SA1-4 each comprise one or more springs. For example, the suspension assemblies SA1-4 may comprise one or more of the following: a coil spring, a leaf spring, a torsion bar or an air spring. In the present embodiment, the suspension assemblies SA1-4 are each in the form of an air suspension comprising an air spring having at least one inflatable bladder (not shown). The suspension assemblies SA1-4 are each controllably connected to a supply of compressed air. The compressed air supply may, for example, comprise a compressor and one or more reservoir. At least one control valve (not shown) is provided for controlling the supply of compressed air to the suspension assemblies SA1-4. By adjusting the pressure of the air spring, the height of the suspension assemblies SA1-4 can be adjusted, thereby modifying a ride height of the vehicle 2. In a variant, the suspension assemblies SA1-4 may optionally comprise a sensor (not shown) for determining a suspension position, for example to provide an indication of compression or extension of the respective suspension assemblies SA1-4.

As shown in FIG. 2, the vehicle 2 comprises a suspension control unit 10 is provided for controlling the suspension assemblies SA1-4. The suspension control unit 10 comprises a suspension controller 11 comprising at least one electronic processor. The suspension controller 11 has one or more inputs 12 and one or more outputs 13. The suspension controller 11 is operable to configure the suspension assemblies SA1-4 in at least first and second suspension configurations. The first and second suspension configurations correspond to first and second suspension heights which are different from each other. The first suspension configuration in the present embodiment corresponds to a normal (i.e. standard or default) suspension height to provide a ride height suitable for driving the vehicle 2 in an on-road scenario. The second suspension configuration in the present embodiment corresponds to an increased suspension height (i.e. a raised suspension relative to the normal suspension height) to provide a raised ride height suitable for driving the vehicle 2 in an off-road scenario. The first suspension configuration is classified as an indicator that the vehicle 2 is in an on-road state. The second suspension configuration is classified as an indicator that the vehicle 2 is in an off-road state. The suspension configurations may be predefined, for example enabling the suspension controller 10 to select one of a plurality of predefined configurations. Alternatively, or in addition, the suspension configurations may be user configurable, for example to enable the user selectively to increase and decrease the suspension height. It will be understood that the suspension control unit 10 can configure the suspension assemblies SA1-4 in more than the first and second suspension configurations. The suspension control unit 10 publishes a suspension status signal SOUT1 comprising data indicating the current configuration of each suspension assembly SA1-4.

The vehicle 2 comprises a powertrain 20 including an internal combustion engine 21 and an electric traction motor 22. A traction battery (not shown) is provided to power the electric traction motor 22. The electric traction motor 22 may be operable independently of, or in conjunction with, the internal combustion engine 21 to propel the vehicle 2. In a variant, the powertrain 20 may comprise one or more electric traction motors 22 as the sole means of propelling the vehicle 2. The powertrain 20 comprises a drivetrain 23 for driving the wheels W1-4 of the vehicle 2. The drivetrain 23 comprises a transmission 24 for transmitting power from the internal combustion engine 21. The transmission 24 is operable automatically to change the selected transmission ratio. The transmission 24 is operable in a high range drive ratio for driving in an on-road scenario; and in a low range drive ratio for driving in an off-road scenario. The selection of the high range drive ratio is classified as an indicator that the vehicle 2 is in an on-road state. The selection of the low range drive ratio is classified as an indicator that the vehicle 2 is in an off-road state. The high range drive ratio may comprise or consist of one or more high range transmission ratios. The low range drive ratio may comprise or consist of one or more low range transmission ratios. In a variant, the electric traction motor 22 may be incorporated into the transmission 24.

In the present embodiment, the drivetrain 23 is configured to drive all four of the wheels W1-4. In a variant, the drivetrain 23 may be configured to drive two of the wheels W1-4, for example to drive either the first and second wheels W1, W2 or to drive the third and fourth wheels W3, W4. In a further variant, the powertrain 20 may be selectively configurable to drive two of the wheels W1-4 or all four of the wheels W1-4. In this arrangement, the selection of two-wheel drive may be classified as an indicator that the vehicle 2 is in an on-road state. Conversely, the selection of four-wheel drive may be classified as an indicator that the vehicle 2 is in an off-road state. For example, the transmission of power to two of the wheels W1-4 may be selectively engaged and disengaged.

The drivetrain 23 may optionally comprise a transfer case (not shown) having one or more low range drive ratio gears. The transfer case may be engaged when the vehicle 2 is driving in an off-road scenario. The transfer case could be selectively engaged by a driver of the vehicle 2 or could be engaged automatically. A transfer case signal may be published comprising data indicating a current status of the transfer case, for example to indicate that the transfer case is engaged or disengaged. The disengagement of the transfer case may be classified as an indicator that the vehicle 2 is in an on-road state. The engagement of the transfer case may be classified as an indicator that the vehicle 2 is in an off-road state.

As shown in FIG. 2, the vehicle 2 comprises an engine control unit 30 provided to control the internal combustion engine 21. The engine control unit 30 is configured to control operation of the internal combustion engine 21 in dependence on a torque request signal. The torque request signal is generated in dependence on a position of a throttle pedal 31. A throttle pedal position sensor 32 is provided to determine a position of the throttle pedal 31. The engine control unit 30 comprises an engine controller 33 comprising at least one electronic processor. The engine controller 33 has one or more inputs 35 and one or more outputs 36. The electronic processor is configured to receive the torque request signal. The engine controller 33 is operable to configure the internal combustion engine 21 in at least first and second engine configurations. The first and second engine configurations may, for example, control the operation of the internal combustion engine 21 in dependence on the torque request signal. The engine control unit 30 publishes an engine status signal SOUT 2 comprising data indicating the current operating conditions of the internal combustion engine 21.

A motor control unit 40 is provided to control the electric traction motor 22. The motor control unit 40 controls operation of the electric traction motor 22 in dependence on the torque request signal. The motor control unit 40 may, for example, control operation of an inverter electrically connected to the electric traction motor 22. The electric traction motor 22 may also be used to regenerate energy, for example to recharge the traction battery. The motor control unit 40 may optionally control the electric traction motor 22 to generate a braking force to retard the vehicle 2 and to regenerate energy. The motor control unit 40 comprises a motor controller 43 comprising at least one electronic processor. The motor controller 43 has one or more inputs and one or more outputs 46. The motor controller 43 is configured to receive the torque request signal. The motor control unit 40 publishes a motor status signal SOUT3 comprising data indicating the current operating conditions of the electric traction motor 22.

As shown in FIG. 2, the vehicle 2 comprises a transmission control unit 50 to control operation of the transmission 24 in dependence on a transmission control signal. In particular, the transmission control unit 50 controls selection of one of a plurality of transmission ratios. The transmission control unit 50 comprises a transmission controller 51 comprising at least one electronic processor. The transmission controller 51 has one or more inputs 53 and one or more outputs 54. The electronic processor 52 is configured to receive a transmission control signal. A transmission control device 55, for example in the form of one or more levers or paddles, is provided to generate the transmission control signal. The user can, for example, operate the transmission control device 55 to select a higher or lower transmission ratio. The transmission control unit 50 may also be configured automatically to control selection of the transmission ratio, for example in dependence on operating conditions of the vehicle 2, such as the reference vehicle speed VREF and/or an engine speed. The transmission control unit 50 publishes a transmission status signal SOUT4 comprising data indicating the current selected transmission ratio. In the present embodiment, the transmission status signal indicates whether a high range drive ratio or a low range drive ratio is selected in the transmission 24. The selection of a high range drive ratio is classified as an indicator that the vehicle 2 is in an on-road state. The selection of a low range drive ratio is classified as an indicator that the vehicle 2 is in an off-road state.

The vehicle 2 is operable in a plurality of different operating modes. The operating modes in the present embodiment are predefined. One or more of the operating modes may optionally be user configurable. Each operating mode controls operation of one or more of the following: the suspension assemblies SA1-4; the internal combustion engine 21; the electric traction motor 22; and the transmission 24. In the present embodiment, the operating modes are configured to tailor dynamic operation of the vehicle 2 for particular terrain or driving conditions. The operating modes in the present embodiment are characterised as follows: (i) Mud and Ruts; (ii) Sand; (iii) Rock Crawl; (iv) Wade; (v) 4×4i; (vi) Wade Aid; (vii) Grass Gravel and Snow (GGS); and (viii) Comfort. It will be understood that some or all of these operating modes may be implemented. As shown in FIG. 2, the vehicle 2 comprises an operating mode control unit 60 to control selection of the operating modes. The operating mode control unit 60 comprises an operating mode controller 61 comprising at least one electronic processor. The operating mode controller 61 has one or more inputs 63 and one or more outputs 64. The operating mode of the vehicle 2 may be selected in dependence on an operating mode control signal. The operating mode control signal may be generated in dependence on a user input, for example using an input device, such as a touch screen, a button, a dial, etc.

Alternatively, or in addition, the operating mode control unit 60 can be configured automatically to select the operating mode. The operating mode may be selected in dependence on vehicle dynamics, such as one or more of the following: wheel slip, vehicle reference speed, (lateral/longitudinal) acceleration, rotational motion (one or more of the following: roll, yaw and pitch motion), angular acceleration, vehicle attitude (one or more of the following: roll, yaw and pitch orientation), ride height; suspension travel (compression/extension), etc. The operating mode may be selected in dependence on a condition(s) of the surface on which the vehicle 2 is travelling, such as one or more of the following: surface roughness, coefficient of friction (μ), incline, wade depth, etc. The electronic processor 62 may automatically select one of a plurality of predefined operating modes. Alternatively, or in addition, the electronic processor 62 may be configured dynamically to define a custom operating mode in dependence on the current vehicle dynamics and/or surface conditions. The custom operating may, for example, be defined by blending or combining one or more aspects of the predefined operating modes. The operating mode control unit 60 may, for example, control the suspension assemblies SA1-4 dynamically to adjust the ride height of the vehicle 2. Alternatively, or in addition, the operating mode control unit 60 may control the transmission 24 dynamically to select a high range drive ratio or a low range drive ratio.

The operating mode control unit 60 publishes an operating mode signal SOUT5 comprising data indicating the current selected operating mode. The selection of the Comfort operating mode is classified as an indicator that the vehicle 2 is in an on-road state. It will be understood that, in practice, the Grass, Gravel and Snow (GGS) operating mode may be selected in either an on-road scenario or an off-road scenario. In the present embodiment, the selection of the Grass Gravel and Snow (GGS) operating mode is classified as an indicator that the vehicle 2 is in an on-road state. The selection of the Mud and Ruts operating mode, the Sand operating mode, the Rock Crawl operating mode, the Wade operating mode, the 4×4i operating mode, and the Wade Aid operating mode are each classified as an indicator that the vehicle 2 is in an off-road state.

The vehicle 2 comprises a parking aid system 6. The parking aid system 6 comprises a park distance control (PDC) system which is configured to generate a proximity alert to notify a driver of the presence of an object (or objects) proximal to the vehicle 2. As described herein, the control system 1 is configured to control generation of the proximity alert. The parking aid system 6 comprises a parking aid controller 70 comprising at least one electronic processor. The part assist system 6 has one or more inputs 73 and one or more outputs 74. The electronic processor 72 is configured to receive proximity signals from a plurality of sensors 75 disposed on the vehicle 2. The sensors 75 are configured to detect the presence of an object (or objects) proximal to the vehicle 2 and to output the proximity signal(s) to the electronic processor 72. The proximity signal(s) may also provide positional data, for example to indicate a distance (range) and/or a position of the object in relation to the sensor 75. The parking aid controller 50 publishes a parking aid status signal comprising data indicating whether an object (or objects) is present or absent.

The sensors 75 in the present embodiment comprise ultrasonic sensors. Alternatively, or in addition, the sensors 75 may comprise an imaging sensor, such as an optical camera. The parking aid system 6 is configured to generate the proximity alert when the object(s) is detected by the sensors 75. In particular, the parking aid system 6 is configured to generate the proximity alert when the detected object(s) is within a threat zone defined around the vehicle 2. The threat zone is defined by detecting when the object(s) is within a predefined first distance of an exterior of the vehicle 2. When an object is detected within the predefined first distance, the parking aid system 6 is configured to generate the proximity alert to notify a driver of the vehicle 2 of the presence of the detected object. The first distance may be uniform or may vary around the vehicle 2. In the present embodiment, the first distance is greater to the rear of the vehicle 2 than to the front or sides thereof. By way of example, the first distance may be 120 cm to the front and side of the vehicle 2, and 180 cm to the rear of the vehicle 2.

The proximity alert comprises an audio component generated by an audio output device 76, such as a loudspeaker. The audio output device 76 may be a dedicated device or may be part of another system, such as an infotainment system. In the present embodiment, the proximity alert also comprises a visual component which is output to a display 77, such as a screen, provided in the vehicle 2. The display 77 may, for example, be provided in an instrument cluster or a centre console of the vehicle 2. The visual component may, for example, comprise a graphical element, such as an icon; a warning light; or a distance (range) indicator. The proximity alert may comprise other forms of alert, such as a haptic alert. In a variant, the parking aid system 6 may modify the proximity alert in dependence on the determined distance to the object. For example, the tone and/or volume of the audio component may change in dependence on the determined distance. Alternatively, or in addition, the visual component may change in dependence on the determined distance, for example by modifying one or more of the following: colour, size, form and composition. The proximity alert could also comprise a haptic component, for example output by a haptic generator.

When the vehicle 2 is operating in an off-road scenario, there is an increased likelihood of the vehicle 2 coming into close proximity with objects, such as terrain features, rocks, tree stumps etc. It has been recognised that the generation of the proximity alert, particularly the audio alert, may be undesirable when the vehicle 2 is operating in these conditions. The control system 1 in the present embodiment is configured to control generation of the proximity alert by the parking aid system 6. In particular, the control system 1 is configured to control generation of the proximity alert in dependence on the determined operating state of the vehicle 2 within the spatial environment. The operating state indicating whether the vehicle is currently in an on-road state or an off-road state. If the determined operating state indicates that the vehicle 2 is in an on-road state, the control system 1 is configured to permit generation of the proximity alert. If the determined operating state indicates that the vehicle 2 is in an off-road state, the control system 1 is configured to implement a different control strategy (or to modify the control strategy applied when the vehicle 2 is in an on-road state) that may partially or completely inhibit generation of the proximity alert.

The control system 1 determines the operating state of the vehicle 2 in dependence on the operating parameters of the systems of the vehicle 2. As described herein, the operating state of the vehicle 2 is determined in dependence on the data received from one or more vehicle systems. The control system 1 comprises one or more alert controllers 80 for controlling generation of the proximity alert in the vehicle 2. The control system 1 is configured to determine an operating state of the vehicle 2 within a spatial environment in dependence on vehicle data from one or more vehicle systems. The operating state indicates whether the vehicle is currently in an on-road state or an off-road state. The control system 1 controls generation of the proximity alert in dependence on the determined operating state. It is to be understood that the or each alert controller 80 can comprise a control unit or computational device having one or more electronic processors (e.g., a microprocessor, a microcontroller, an application specific integrated circuit (ASIC), etc.), and may comprise a single control unit or computational device, or alternatively different functions of the or each alert controller 80 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the alert controller 80 to implement the control techniques described herein (including some or all of the functionality required for the method described herein). The set of instructions could be embedded in said one or more electronic processors of the alert controller 80; or alternatively, the set of instructions could be provided as software to be executed in the alert controller 80. A first controller or control unit may be implemented in software run on one or more processors. One or more other controllers or control units may be implemented in software run on one or more processors, optionally the same one or more processors as the first controller or control unit. Other arrangements are also useful.

Figure 3:
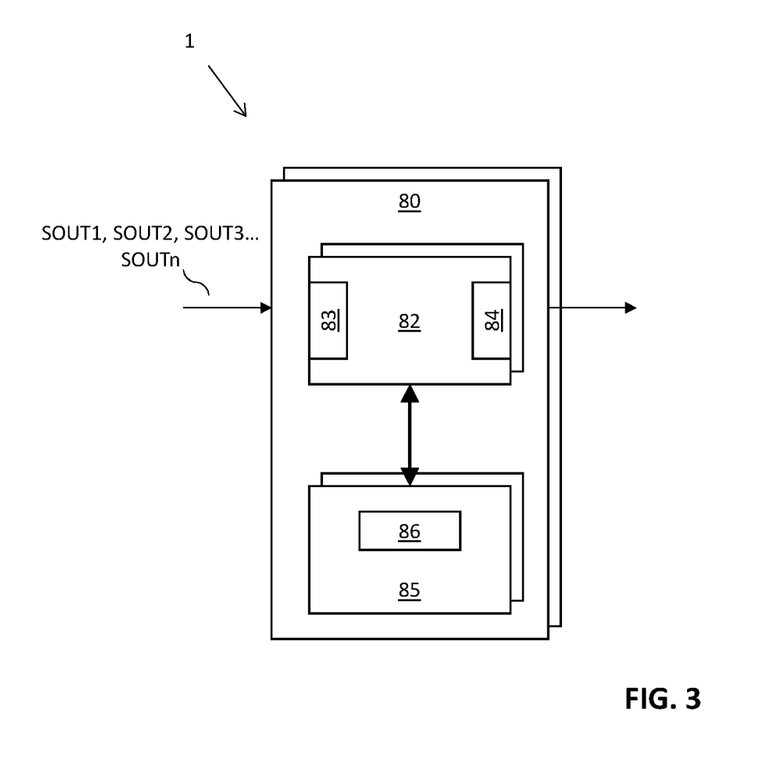
FIG. 3 shows a schematic representation of the control system in accordance with the present invention.

In the example illustrated in FIG. 3, the or each alert controller 80 comprises at least one electronic processor 82 having one or more electrical input(s) 83 for receiving one or more input signal(s), and one or more electrical output(s) 84 for outputting one or more output signal(s). The or each alert controller 80 further comprises at least one memory device 85 electrically coupled to the at least one electronic processor 82 and having instructions 86 stored therein. The at least one electronic processor 82 is configured to access the at least one memory device 85 and execute the instructions 86 thereon so as to perform the method(s) described herein.

The, or each, electronic processor 82 may comprise any suitable electronic processor (e.g., a microprocessor, a microcontroller, an ASIC, etc.) that is configured to execute electronic instructions. The, or each, electronic memory device 85 may comprise any suitable memory device and may store a variety of data, information, threshold value(s), lookup tables or other data structures, and/or instructions therein or thereon. In an embodiment, the memory device 85 has information and instructions for software, firmware, programs, algorithms, scripts, applications, etc. stored therein or thereon that may govern all or part of the methodology described herein. The processor, or each, electronic processor 82 may access the memory device 85 and execute and/or use that or those instructions and information to carry out or perform some or all of the functionality and methodology describe herein.

The at least one memory device 85 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

The electronic processor 82 is configured to determine the operating state of the vehicle 2 in dependence on the data received from one or more of the following: the suspension control unit 10, the engine control unit 30, the motor control unit 40, the transmission control unit 50 and the operating mode control unit 60. The one or more inputs 83 of the electronic processor 83 receive one or more of the following: the vehicle reference speed VREF; the suspension status signal; the transfer case signal; the engine status signal; the motor status signal; the transmission status signal; and the operating mode signal. As described herein, the various operating parameters are classified as indicating either an on-road state or an off-road state. The control system 1 can thereby determine the operating state to identify whether the vehicle 2 is in an on-road state or an off-road state. The electronic processor 82 may optionally also use the vehicle reference speed VREF to determine the operating state of the vehicle 2. For example, the electronic processor 82 may determine that the operating state indicates that the vehicle 2 is currently in an on-road state if the vehicle reference speed VREF is greater than a predefined threshold, for example 40 kph.

The control system 1 is configured to control the generation of the proximity alert in dependence on the determined operating state. Controlling generation of the proximity alert may comprise controlling the audio component and/or the visual component of the proximity alert. For example, the generation of the audio component may be inhibited or the volume of the audio component may be reduced when the determined operating state indicates that the vehicle 2 is in an off-road state. In the present embodiment, the control system 1 is configured to apply a first control strategy when the operating state indicates that the vehicle 2 is in an on-road state; and to apply a second control strategy when the operating state indicates that the vehicle 2 is in an off-road state. The first and second control strategies are different from each other. The first control strategy generates a first proximity alert comprising a first audio component and a first visual component when an object (or objects) is detected within the threat zone TZ. The second control strategy generates a second proximity alert comprising a second audio component and a second visual component when an object (or objects) is detected within the threat zone TZ. The volume of the second audio component may be lower than that of the first audio component. Other changes to the audio component could be applied, for example to modify the pitch and/or tone of the audio component according to the first and second control strategies. It will be understood that other versions of the first and second control strategies are also contemplated. In a variant, the second control strategy may inhibit generation of one or both of the second audio component and the second visual component of the proximity alert. In a variant, the control system 1 may modify the first distance used by the parking aid system 6 to trigger generation of the proximity alert. The control system 1 may be configured to reduce the first distance (or apply a second distance which is less than the first distance) when the determined operating state indicate that the vehicle 2 is currently in an off-road state. Thus, when the vehicle 2 is operating in an off-road state, the proximity alert may be generated only by an object (or objects) disposed closer to the vehicle 2 than when the vehicle 2 is operating in an on-road state. The effective size of the threat zone TZ may be reduced when operating in the off-road state.

Figure 4:
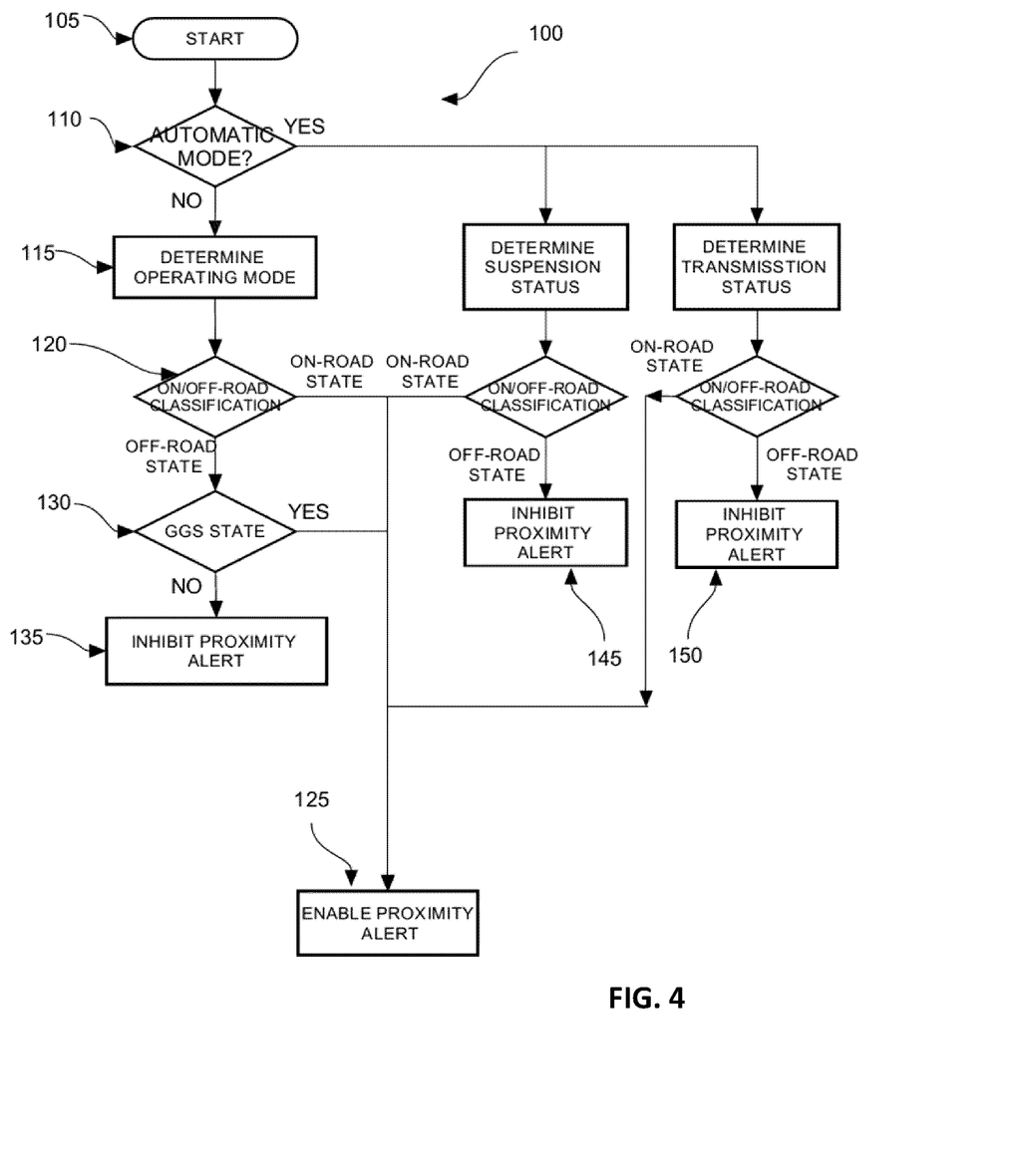
FIG. 4 shows a block diagram representing operation of the control system in accordance with an embodiment of the invention.

The operation of the control system 1 to control generation of the proximity alert by the parking aid system 6 will now be described with reference to the first block diagram 100 shown in FIG. 4. The generation of the proximity alert is described as being inhibited (i.e. restricted, blocked or prevented) or uninhibited (i.e. allowed or permitted). As outlined herein, inhibiting generation of the proximity alert comprises inhibiting the audio component and optionally the visual component of the proximity alert.

The control system 1 is activated (BLOCK 105). The alert controller 80 determines if the operating mode control unit 60 is operating in dependence on a manual mode (i.e. in dependence on a user input) or in an automatic mode (BLOCK 110). If the operating mode control unit 60 is in a manual control mode, the alert controller 80 determines which operating mode is currently selected (BLOCK 115) and then performs a check to determine if the selected operating mode has been classified as an indicator that the vehicle 2 is in an on-road state or an off-road state (BLOCK 120). If the selected operating mode has been classified as indicating an on-road state (for example, the Comfort operating mode is selected), the generation of the proximity alert is uninhibited (i.e. enabled) (BLOCK 125). If the selected operating mode is not classified as being an on-road state, a check is made to determine if the user has selected the Grass, Gravel and Snow (GGS) operating mode (BLOCK 105). If the Grass, Gravel and Snow (GGS) operating mode has been selected, the generation of the proximity alert is uninhibited (BLOCK 125). If the user has not selected the Grass, Gravel and Snow (GGS) operating mode, the generation of the proximity alert is inhibited (BLOCK 135). Thus, if the user has selected any of the operating modes classified as indicating that the vehicle 2 is operating in an off-road state (i.e. the Mud and Ruts operating mode, the Sand operating mode, the Rock Crawl operating mode, the Wade operating mode, the 4×4i operating mode, and the Wade Aid operating mode), the generation of the proximity alert is inhibited. The alert controller 80 continues to monitor the operating mode selected by the user.

If the operating mode control unit 60 is in an automatic control mode, the configuration of one or more vehicle systems, such as the suspension assemblies SA1-4 and the transmission 23, may be adjusted without a user input. As outlined above, the adjustments may comprise selecting one of the predefined operating modes; or may comprise dynamically adjusting the configuration of one or more vehicle systems. If the operating mode control unit 60 is configured automatically to select one of the predefined operating modes, the process described above to control generation of the proximity alert in dependence on a determination of the automatically selected operating mode can be implemented. If the operating mode control unit 60 is operable to configure one or more vehicle systems dynamically, either with or without referencing the predefined operating modes, the alert controller 80 may not be able to utilise the selected operating mode to determine whether the vehicle 2 is in an on-road state or an off-road state. Instead, the alert controller 80 may assess the configuration of one or more vehicle systems to determine the operating state. In the present embodiment, the alert controller 80 reads the suspension status signal to determine the ride height of the suspension assemblies SA1-4 (BLOCK 140). If the suspension assemblies SA1-4 are in the first suspension configuration suitable for on-road driving, the generation of the proximity alert is uninhibited (BLOCK 125). If the suspension assemblies SA1-4 are in the second suspension configuration suitable for off-road driving, the generation of the proximity alert is inhibited (BLOCK 145). The alert controller 80 reads the suspension status signal to determine the ride height of the suspension assemblies SA1-4 (BLOCK 140). If the suspension assemblies SA1-4 are in the first suspension configuration suitable for on-road driving, the generation of the proximity alert is uninhibited (BLOCK 125). If the suspension assemblies SA1-4 are in the second suspension configuration suitable for off-road driving, the generation of the proximity alert is inhibited (BLOCK 145). The alert controller 80 may optionally also read the transmission status signal to determine whether the transmission 23 is in a low range drive ratio or a high range drive ratio (BLOCK 150). If the transmission 23 is in a high range drive ratio, the generation of the proximity alert is uninhibited (BLOCK 145). If the transmission 23 is in a low range drive ratio, the generation of the proximity alert is inhibited (BLOCK 150). The alert controller 80 continues to monitor the operating parameters of the vehicle systems. The alert controller 80 monitors the one or more vehicle systems to determine if the vehicle 2 is in an on-road state or an off-state. The generation of the proximity alert is controlled in dependence on this determination. As a result, the generation of the proximity alert can be controlled (i.e. enabled and inhibited) in a consistent and reliable manner. At least in certain embodiments, this may help to avoid the situation where the generation of the proximity alert is inhibited unexpectedly.

The above process to monitor the selected operating mode may also be applicable when the operating mode control unit 60 is operating in an automatic control mode. The generation of the proximity alert may be inhibited if the operating mode control unit 60 has selected an operating mode classified as indicating that the vehicle 2 is operating in an off-road state. Conversely, the generation of the proximity alert may be uninhibited if the operating mode control unit 60 has selected an operating mode classified as indicating that the vehicle 2 is operating in an on-road state. The configuration of other vehicle systems, such as the internal combustion engine 21 and the motor 22, may be used to determine whether the vehicle 2 is operating in an on-road state or an off-road state. It will be understood that the configuration of more than one vehicle system may be used to make a determination as to the operating state of the vehicle 2. For example, the control system 1 may determine that the vehicle 2 is operating in an off-road state only when both the transmission 24 and the suspension assemblies SA-n are in a particular configuration. The techniques for assessing the operating state of the vehicle 2 have been described herein in relation to a vehicle 2 configured automatically to select an operating mode. However, it will be understood that the same techniques may be used independently to assess the operating state of the vehicle 2. For example, the techniques may be used to determine the operating state of the vehicle 2 in dependence on the user configuration of one or more vehicle systems (such as the transmission 24 and/or the suspension assemblies SA-n).

As described herein, the control system 1 is configured to inhibit generation of the proximity alert when the vehicle 2 is operating in an off-road state. It will be understood that re-enabling generation of the proximity alert may be determined in dependence on one or more factors. For example, the generation of the proximity alert may be re-instated when the vehicle 2 is operating in an on-road state. Alternatively, a user input may be used to re-instate generation of the proximity alert. The generation of the proximity alert may be re-instated after expiry of a predetermined time period or upon the next vehicle ignition start-up event. Alternatively, or in addition, the generation of the proximity alert may be re-instated when the vehicle reference speed VREF is greater than a predefined speed threshold, for example 30 kph, 40 kph or 50 kph.

The operation of the control system 1 has been described herein with particular reference to the operating mode control unit 60. It will be understood that other vehicle systems may be used as an indicator that the vehicle 2 is in an off-road state. For example, the vehicle 2 may comprise an off-road camera 90 which is intended for use primarily when the vehicle 2 is off-road. The off-road camera 90 may be configured to capture an image of a terrain region proximal to the vehicle 2, for example in front of the vehicle 2 or beneath the host vehicle 2. The control system 1 may be configured to determine that the vehicle 2 is operating in an off-road state when the off-road camera 90 is activated by a user. The control system 1 may inhibit generation of the proximity alert upon determining that the off-road camera 90 has been activated. Alternatively, or in addition, the control system 1 may utilise data measured by an inertial measurement unit (IMU) to determine if the vehicle 2 is operating in an off-road state or an on-road state. In use, the IMU measures acceleration of the vehicle 2 about one or more axis (horizontal, vertical and lateral). The control system 1 can determine that the vehicle 2 is operating in an off-road state 2 if the measured acceleration is greater than a predefined threshold. Alternatively, or in addition, the control system 1 can determine that the vehicle 2 is operating in an off-road state 2 if an inclination angle of the host vehicle (pitch and/or yaw) is greater than a predefined threshold.

In a further variant, the control system 1 could determine when the vehicle 2 is in an off-road state with reference to map data. For example, the control system 1 may determine the geospatial location of the vehicle 2 using a satellite navigation system. The control system 1 may compare the determined geospatial location with the map data to determine the location of the vehicle 2 in relation to a road network (which may include tracks and other metaled surfaces). The control system 1 determines that the vehicle 2 is in an on-road state if the determined location is on (or proximal to) a road defined in the map data. The control system 1 determines that the vehicle 2 is in an off-road state if the determined location is spaced apart from a road defined in the map data. The control system 1 can control generation of the proximity alert in dependence on the determination.

Other techniques may be used to determine the operating state of the vehicle 2 in order to determine if the vehicle 2 is operating in on-road state or an off-road state. The vehicle 2 may comprise one or more imaging sensors 91 arranged to capture an image external to the vehicle 2. The one or more imaging sensors 91 may, for example, each comprise an optical camera or a LIDAR array. The one or more imaging sensors 91 may output image data to an image processor 92. The image processor 92 is configured to process the image data to determine if the vehicle 2 is operating in an on-road scenario or an off-road scenario. The image processor 92 may be configured to identify objects and/or terrain features within the captured scene to assess the spatial environment. The image processor 92 may, for example, assess terrain/surface roughness to determine if the vehicle 2 is operating in an on-road state or an off-road state.

Alternatively, or in addition, the control system 1 could determine when the vehicle 2 is in an off-road state with reference to map data. For example, the control system 1 may determine the geospatial location of the vehicle 2 using a satellite navigation system. The control system 1 may compare the determined geospatial location with the map data to determine the location of the vehicle 2 in relation to a road network (which may include tracks and other metaled surfaces). The control system 1 determines that the vehicle 2 is in an on-road state if the determined location is on (or proximal to) a road defined in the map data. The control system 1 determines that the vehicle 2 is in an off-road state if the determined location is spaced apart from a road defined in the map data. The control system 1 can control generation of the proximity alert in dependence on the determination.

Example alert controllers 80 have been described comprising at least one electronic processor 82 configured to execute electronic instructions stored within at least one memory device 85, which when executed causes the electronic processor(s) 82 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system for controlling generation of a proximity alert for a vehicle, the control system comprising one or more controllers, wherein the control system is configured to:

determine an operating state of the vehicle within a spatial environment in dependence on vehicle data from one or more vehicle systems, the operating state indicating whether the vehicle is currently in an on-road state or an off-road state;

control generation of the proximity alert in dependence on the determined operating state; and control generation of the proximity alert by inhibiting generation of the proximity alert when the determined operating state indicates that the vehicle is in the off-road state.

2. The control system of claim 1, wherein the one or more controllers collectively comprise:

at least one electronic processor having an electrical input receiving the vehicle data from the one or more vehicle systems; and at least one memory device having instructions stored therein, wherein the at least one electronic processor is configured to access the at least one memory device and execute the instructions, the execution of the instructions determining the operating state of the vehicle.

3. The control system of claim 1, wherein the proximity alert comprises at least one of an audio component and a visible component.

4. The control system of claim 1, wherein the control system is configured to control generation of the proximity alert by changing a characteristic of the proximity alert when the determined operating state indicates that the vehicle is in an off-road state.

5. The control system of claim 1, wherein the control system is configured to control generation of the proximity alert by enabling generation of the proximity alert when the determined operating state indicates that the vehicle is in an off-road state.

6. The control system of claim 1, wherein the control system is configured to control generation of the proximity alert by modifying a first distance for activating the proximity alert.

7. The control system of claim 6, wherein the control system is configured to apply the first distance when the determined operating state indicates that the vehicle is currently in an on-road state and to apply a second distance when the determined operating state indicates that the vehicle is currently in an off-road state, and the first and second distances are different from each other.

8. The control system of claim 1, wherein the vehicle data comprises one or more of:

an operating mode signal indicating a current operating mode of the vehicle;

a transmission mode signal indicating a current drive ratio; and a suspension status signal indicating a current suspension configuration of the vehicle.

9. The control system of claim 1, wherein the vehicle data comprises geospatial data indicating a current geospatial location of the vehicle.

10. The control system of claim 1, wherein the vehicle data comprises sensor data captured by a sensor disposed on the vehicle.

11. A vehicle comprising the control system of claim 1.

12. A method of controlling generation of a proximity alert for a vehicle, the method comprising:

determining an operating state of the vehicle within a spatial environment, the operating state indicating whether the vehicle is currently in an on-road state or an off-road state;

controlling generation of the proximity alert in dependence on the determined operating state; and controlling generation of the proximity alert by inhibiting generation of the proximity alert when the determined operating state indicates that the vehicle is in the off-road state.

13. A non-transitory computer-readable storage medium storing instructions that, when executed by one or more electronic processors, causes the one or more electronic processors to carry out the method of claim 12.

* * * * *